(12) United States Patent
Xu et al.

(10) Patent No.: US 10,248,237 B2
(45) Date of Patent: Apr. 2, 2019

(54) TOUCH PANEL, METHOD FOR MANUFACTURING THE SAME AND DISPLAY DEVICE

(71) Applicants: BOE TECHNOLOGY GROUP CO., LTD., Beijing (CN); HEFEI XINSHENG OPTOELECTRONICS TECHNOLOGY CO., LTD., Anhui (CN)

(72) Inventors: Zouming Xu, Beijing (CN); Ming Hu, Beijing (CN); Hongqiang Luo, Beijing (CN)

(73) Assignees: BOE TECHNOLOGY GROUP CO., LTD., Beijing (CN); HEFEI XINSHENG OPTOELECTRONICS TECHNOLOGY CO., LTD., Anhui (CN)

( * ) Notice: Subject to any disclaimer, the term of this patent is extended or adjusted under 35 U.S.C. 154(b) by 185 days.

(21) Appl. No.: 15/309,213

(22) PCT Filed: Mar. 28, 2016

(86) PCT No.: PCT/CN2016/077520
§ 371 (c)(1),
(2) Date: Nov. 7, 2016

(87) PCT Pub. No.: WO2016/155594
PCT Pub. Date: Oct. 6, 2016

(65) Prior Publication Data
US 2017/0083138 A1 Mar. 23, 2017

(30) Foreign Application Priority Data
Apr. 3, 2015 (CN) .......................... 2015 1 0159679

(51) Int. Cl.
*G06F 3/045* (2006.01)
*G06F 3/041* (2006.01)
*G06F 3/044* (2006.01)

(52) U.S. Cl.
CPC ............ *G06F 3/0412* (2013.01); *G06F 3/044* (2013.01); *G06F 2203/04103* (2013.01); *G06F 2203/04107* (2013.01)

(58) Field of Classification Search
CPC ........ G06F 3/044; G06F 3/0412; G06F 3/041; G06F 2203/04103; G06F 2203/04107
See application file for complete search history.

(56) References Cited

U.S. PATENT DOCUMENTS 8,686,308 B2 * 4/2014 Kuriki ..................... G06F 3/044
200/600
8,698,029 B2 * 4/2014 Scuderi .................. G06F 3/044
200/600

(Continued)

FOREIGN PATENT DOCUMENTS

CN 101647326 A 2/2010
CN 103150053 A 6/2013

(Continued)

OTHER PUBLICATIONS

First Office Action for Chinese Application No. 201510159679.3, dated Mar. 24, 2017, 7 Pages.

(Continued)

*Primary Examiner* — Vijay Shankar
(74) *Attorney, Agent, or Firm* — Brooks Kushman P.C.

(57) ABSTRACT

The present disclosure discloses a touch panel, a method for manufacturing the same, and a display device. The method includes forming signal transmission lines that are connected with touch electrodes on the touch panel, and forming a ground wire that is arranged at a different layer from and insulated from the signal transmission lines, a projection of (Continued)

the ground wire onto a plane in which the signal transmission lines are located intersecting the signal transmission lines. A plurality of capacitor structures for storing static electricity is formed by the signal transmission lines and the ground wire at intersections.

6 Claims, 2 Drawing Sheets

(56) References Cited

U.S. PATENT DOCUMENTS

| | | |
|---|---|---|
| 9,285,939 B2 * | 3/2016 | Chang .................. G06F 3/044 |
| 2013/0271675 A1 | 10/2013 | Misaki |
| 2015/0083569 A1 | 3/2015 | Chang et al. |
| 2017/0083138 A1 | 3/2017 | Xu et al. |

FOREIGN PATENT DOCUMENTS

| | | |
|---|---|---|
| CN | 103270476 A | 8/2013 |
| CN | 103576984 A | 2/2014 |
| CN | 104461107 A | 3/2015 |
| CN | 104731435 A | 6/2015 |
| WO | 2008102717 A1 | 8/2008 |

OTHER PUBLICATIONS

International Search Report and Written Opinion for Application No. PCT/CN2016/077520, dated Jun. 7, 2016, 13 Pages.
Second Office Action for Chinese Application No. 201510159679.3, dated Oct. 17, 2017, 5 Pages.

* cited by examiner forming signal transmission lines that are connected with touch electrodes on the touch panel, and forming a ground wire that is arranged at a different layer from and insulated from the signal transmission lines, a projection of the ground wire onto a plane in which the signal transmission lines are located intersecting the signal transmission lines,
wherein a plurality of capacitor structures for storing static electricity is formed between the signal transmission lines and the ground wire at intersections ⎯⎯ S202

FIG. 2

TOUCH PANEL, METHOD FOR MANUFACTURING THE SAME AND DISPLAY DEVICE

CROSS-REFERENCE TO RELATED APPLICATIONS

This application is the U.S. national phase of PCT Application No. PCT/CN2016/077520 filed on Mar. 28, 2016, which claims priority to Chinese Patent Application No. 201510159679.3 filed on Apr. 3, 2015, the disclosures of which are incorporated in their entirety by reference herein.

TECHNICAL FIELD

The present disclosure relates to the field of display technology, in particular to a touch panel, a method for manufacturing the same, and a display device.

BACKGROUND

Along with a rapid development of science and technology, a touch technology is widely used. For example, it may be applied to an industrial production field (a central controller, a measuring instrument, etc), an application field of life (a smart phone, a global positioning system (GPS), a note book, etc), a commercial application field (a self-service cash register, a point of sale (POS), etc), an education and entertainment field (an electronic book, an electronic whiteboard, etc), and a medical device field (a nursing vehicle, a medical diagnostic machine, etc).

Currently, according to an induction principle, the touch panel can be classified into types of resistance, capacitance, surface acoustic wave, infrared, etc. According to a structural relationship between the touch panel and a display screen, the touch panel can be classified into types of one glass solution (OGS) touch panel, On-cell touch panel and In-cell touch panel.

In a design of the touch panel, electro-static discharge (ESD), as well as its protection, needs to be considered. Since a touch technology does not involve a semiconductor technology, it is not possible to make a LCD-like electrostatic protection device. Currently, an ESD design of the touch technology is mainly realized by being encircled with a GND line. In this way, there is a certain protection effect on a smaller ESD, but the effect for a larger ESD is very limited. As a result, the touch function of the product may be adversely affected, which is a challenge to product yield and performance.

Therefore, how to design an electrostatic protection solution to increase an antistatic threshold of the product, and thus improve the product yield, is an issue to be resolved in urgent need at present.

SUMMARY

A main object of the present disclosure is to provide a solution, which can discharge static electricity generated in a touch panel, and thereby can avoid the loss of a touch function of the touch panel caused by poor electrostatic protection, and improve product yield and performance of the touch panel by way of increasing an antistatic threshold of the touch panel.

To achieve the above-mentioned object, the present disclosure provides a touch panel, a method for manufacturing the same, and a display device.

In one aspect, the present disclosure provides a touch panel, including: touch electrodes, signal transmission lines connected with the touch electrodes, and a ground wire arranged at a different layer from and insulated from the signal transmission lines, a projection of the ground wire onto a plane in which the signal transmission lines are located intersecting the signal transmission lines, wherein a plurality of capacitor structures for storing static electricity is formed by the signal transmission lines and the ground wire at intersections.

Optionally, the touch panel further includes an insulation medium layer between the signal transmission lines and the ground wire.

Optionally, a line width of each signal transmission line is greater than a preset width threshold, wherein the width threshold is 0.5 mm.

Optionally, the line width is greater than or equal to 2.5 mm, and less than or equal to 4.5 mm.

Optionally, the signal transmission lines are made of a metal material or a transparent conducting material.

Optionally, the transparent conducting material comprises indium tin oxide or aluminum-doped zinc oxide, and the metal material comprises molybdenum, aluminum or copper.

Optionally, the touch electrodes are made of indium tin oxide or aluminum-doped zinc oxide or graphene.

Optionally, the insulation medium layer is a polypropylene film or a polyethylene film or air.

In another aspect, the present disclosure provides a display device including the above touch panel.

In another aspect, the present disclosure provides a method for manufacturing a touch panel, including: forming signal transmission lines that are connected with touch electrodes on the touch panel, and a ground wire that is arranged at a different layer from and insulated from the signal transmission lines, a projection of the ground wire onto a plane in which the signal transmission lines are located intersecting the signal transmission lines, wherein a plurality of capacitor structures for storing static electricity is formed by the signal transmission lines and the ground wire at intersections.

Optionally, the step of forming signal transmission lines that are connected with touch electrodes on the touch panel, and a ground wire that is arranged at a different layer from and insulated from the signal transmission lines comprises: forming an insulation medium layer between the signal transmission lines and the ground wire.

Optionally, a line width of each signal transmission line is greater than a preset width threshold, wherein the width threshold is 0.5 mm.

Optionally, the line width is greater than or equal to 2.5 mm, and less than or equal to 4.5 mm.

Optionally, the signal transmission lines are made of a metal material or a transparent conducting material.

Optionally, the transparent conducting material comprises indium tin oxide or aluminum-doped zinc oxide, and the metal material comprises molybdenum, aluminum or copper.

Optionally, the touch electrodes are made of indium tin oxide or aluminum-doped zinc oxide or graphene.

Optionally, the insulation medium layer is a polypropylene film or a polyethylene film or air.

Comparing with the related art, the touch panel, the method and the display device described in the present disclosure can timely store the static electricity generated by the touch electrode through a plurality of capacitor structures formed between the signal transmission lines and the ground wire, and further discharge the static electricity to the ground through the ground wire, so as to protect an inner pixel on the touch panel and avoid the loss of the touch function of the touch panel caused by the static electricity, thereby improving the product yield and performance of the touch panel.

BRIEF DESCRIPTION OF THE DRAWINGS

FIG. 2 is a schematic view of a method for manufacturing a touch panel according to an embodiment of the present disclosure.

DETAILED DESCRIPTION

Figure 1:
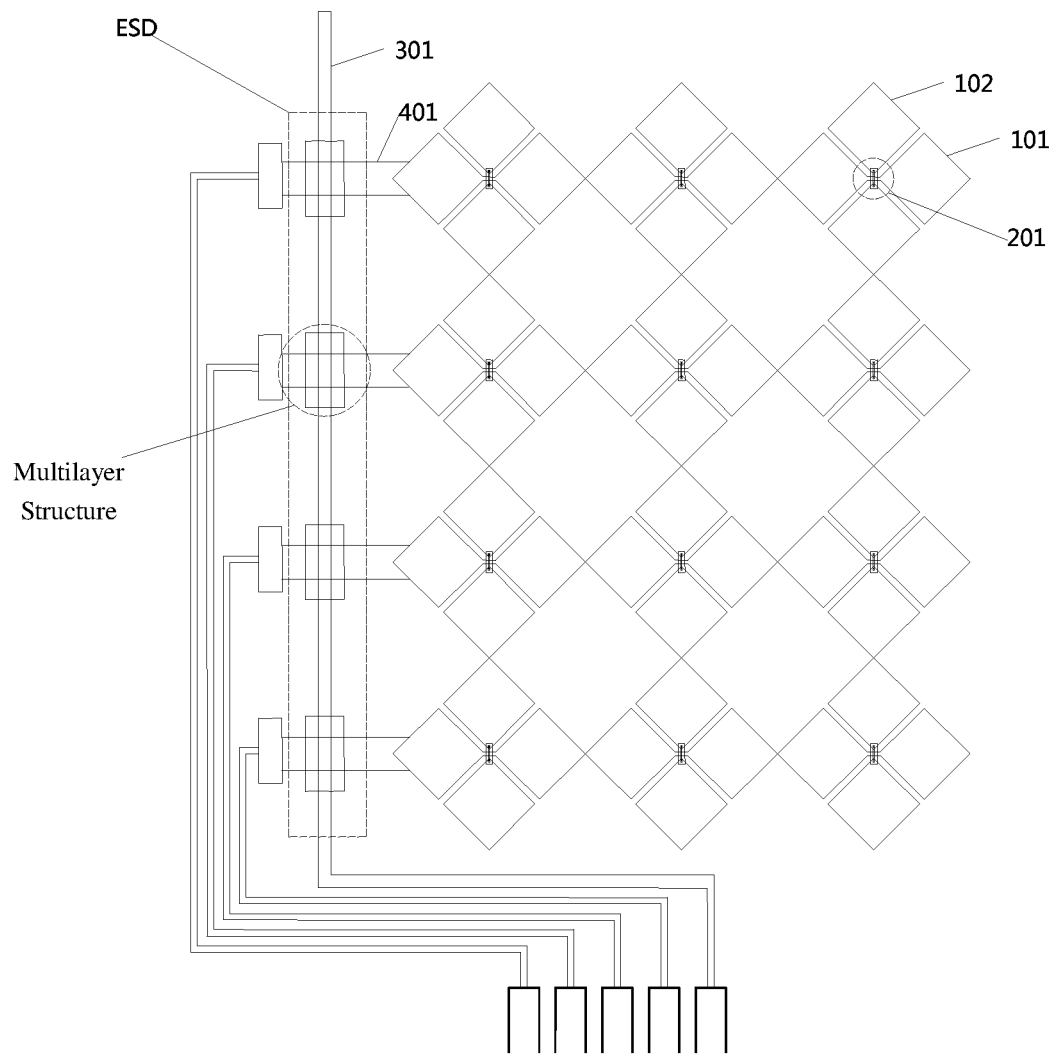
FIG. 1 is a structural schematic view showing a touch panel according to an embodiment of the present disclosure.

The present disclosure will be described hereinafter in a clear and complete manner in conjunction with the drawings and embodiments. Apparently, the following embodiments are merely a part of, rather than all of, the embodiments of the present disclosure. Based on these embodiments, other embodiments, which can be obtained by the persons of ordinary skills in the art without any inventive effort, also fall within the scope of the present disclosure.

Unless otherwise defined, any technical or scientific terms used herein shall have the common meaning understood by a person of ordinary skills. Such words as "first" and "second" used in the specification and claims are merely used to differentiate different components rather than to represent any order, number or importance. Similarly, such words as "one" or "one of" are merely used to represent the existence of at least one member, rather than to limit the number thereof. Such words as "connect" or "connected to" may include electrical connection, direct or indirect, rather than being limited to physical or mechanical connection. Such words as "on/above", "under/below", "left" and "right" are merely used to represent relative position relationship, and when an absolute position of an object is changed, the relative position relationship will be changed too.

In a present touch panel (such as OGS touch panel), ESD, used for discharging the static electricity generated by the touch electrode, is mainly realized by being encircled with a GND line. By this way, the effect is very limited in case of more static electricity, often resulting in the loss of the touch function of the touch panel. Based on this, the present disclosure mainly provides a solution which can prevent the touch panel from losing the touch function.

An embodiment of the present disclosure provides a touch panel. The touch panel includes touch electrodes, signal transmission lines connected with the touch electrodes, and a ground wire arranged at a different layer from and insulated from the signal transmission lines, a projection of the ground wire onto a plane in which the signal transmission lines are located intersecting the signal transmission lines, wherein a plurality of capacitor structures for storing static electricity is formed by the signal transmission lines and the ground wire at intersections.

In the above capacitor structures that can store the static electricity (the touch electrode is a main generation source of the static electricity), the signal transmission lines and the ground wire are two plates of the above capacitor structures. A position relationship between these two plates has no impact on a function of storing static electricity of the capacitor structures. That is to say, the ground wire can be positioned below the signal transmission lines, or the ground wire may also be positioned above the signal transmission lines.

In the embodiment of the present disclosure, the touch panel may also include an insulation medium layer between the signal transmission lines and the ground wire.

That is, during a manufacturing process, an insulation medium layer needs to be formed during forming the signal transmission lines and forming the ground wire. There are a lot of options for the material of the insulation medium layer. The insulation medium layer can be a polypropylene film, a polyethylene film, etc. Any method for forming the insulation medium layer may be considered, as long as it is suitable for the manufacturing process of the touch panel.

Of course, if the process allows, air may also be formed between the signal transmission lines and the ground wire as the insulation medium, as long as it can function as the insulation medium between the capacitor plates.

In an embodiment of the present disclosure, a line width of the signal transmission line may be greater than a preset width threshold, wherein the width threshold is 0.5 mm. At present, the line width of the signal transmission lines used to connect with the touch electrodes is generally set between 0.1 mm-0.5 mm. In order to make the signal transmission lines as one plate of the above capacitor structures and enable the capacitor structures to store more static electricity, the line width of each signal transmission line is widened in the embodiment of the disclosure. Certainly, a range of the line width at present may also be used, but the formed capacitors may have a poor capacity in storing static electricity.

On this basis, in an embodiment of the present disclosure, a better range is further given for the line width of the signal transmission lines. For example, the line width may be greater than or equal to 2.5 mm, and less than or equal to 4.5 mm. According to an experiment result, when the line width of each signal transmission line is set to be between 2.5 mm-4.5 mm, the capacitor structures may have a better capacity in storing static electricity.

In an embodiment of the present disclosure, the signal transmission lines may be made of a metal material or a transparent conducting material. The transparent conducting material may include indium tin oxide or aluminum-doped zinc oxide; and the metal material may include molybdenum (Mo), aluminum (Al) or copper (Cu).

Of course, the above options of the transparent conducting material and the metal material just are optional. In the practical use, the materials having same or similar characteristics may be adopted, and it is not limited to the above options.

In an embodiment of the present disclosure, the touch electrodes may be made of indium tin oxide (ITO) or aluminum-doped zinc oxide (AZO) or graphene. Of course, the material used for the touch electrodes is not limited, and the material that is suitable for the touch electrodes in the related art may be considered.

In order to make the above capacitor structures provided by the embodiment of the present disclosure easier to understand, the above capacitor structures will be further described below with reference to FIG. 1.

Because some defects exists in the electrostatic protection of the touch product at present, and the ESD problem occurs in an bridge-point area in most cases, in the following, a structure of the OGS touch panel is taken as an example. An electrostatic protection unit (ESD unit) for discharging electricity in the structure has a plurality of multilayer structures (i.e., the capacitor structures), and mainly consists of transmission lines (i.e., the above signal transmission lines), the ground wire, and the insulation medium layer therebetween. One end of each transmission line is connected to a transparent electrode (i.e., the touch electrode), and the other end is connected to an internal wiring Pad. The ground wire is arranged at a different layer from the transmission lines. This structure makes the transmission lines and the ground wire form a plurality of capacitors that can store static electricity from the transparent electrode.

FIG. 1 is a structural schematic view showing a touch panel according to an embodiment of the present disclosure. As shown in FIG. 1, descriptions for the structure are as follows:

1. The touch panel has transparent electrodes 101 arranged in rows and transparent electrodes 102 arranged in columns. The material of the transparent electrodes may be indium tin oxide (ITO) or aluminum-doped zinc oxide (AZO) or graphene. The transparent electrodes 102 arranged in columns are connected to each other by via holes in the insulation layers and bridge structures 201.

2. The transparent electrodes 101 and the internal wiring Pads are connected with transmission lines 401. The material of the transmission lines may be the transparent conducting material (such as ITO, AZO) or the metal material (such as Mo/Al/Mo, Cu). The line width of each signal transmission line may be set in a range of 2.5 mm-4.5 mm. For example, in an actual process, the line width of each signal transmission line may be set to about half of a pixel interval of the touch panel.

A GND wire 301 (i.e., the ground wire) may be arranged on a layer above or under the transmission lines 401. The GND wire 301, the transmission lines and the insulation layer located therebetween together form multilayer structures (i.e., the capacitor structures). The insulation layer may be an overcoat (OC) material or other insulating material. Since there are multiple capacitor structures, when stronger static electricity exists, a plurality of multilayer structures, which function as ESD, can timely discharge the static electricity to the ground wire.

The embodiment of the present disclosure also provides a display device. The display device includes the touch panel mentioned above. The display device may be any product or part with a displaying function, such as a display panel, a television, a displayer, a digital photo frame, a phone, a tablet computer, etc.

The embodiment of the present disclosure also provides a method for manufacturing a touch panel. FIG. 2 is a schematic view of a method for manufacturing a touch panel according to an embodiment of the present disclosure. As shown in FIG. 2, the flow includes the following step:

In step S202, forming, signal transmission lines that are connected with touch electrodes on the touch panel, and a ground wire that is arranged at a different layer from and insulated from the signal transmission lines, a projection of the ground wire onto a plane in which the signal transmission lines are located intersecting the signal transmission lines, wherein a plurality of capacitor structures for storing static electricity is formed by the signal transmission lines and the ground wire at intersections.

In the embodiment of the present disclosure, during a process of forming the signal transmission lines and the ground wire, an insulation medium layer may also be formed between the signal transmission lines and the ground wire.

That is to say, during a process of forming the entire touch panel, to form the capacitor structures for storing static electricity, different processes may be adopted according to a position relationship between the signal transmission lines and the ground wire. For example, the ground wire may be formed first, and then the insulation medium layer is formed, and finally the signal transmission lines are formed. Since the touch electrodes and the signal transmission lines are connected, the touch electrode may be formed in a same layer as the signal transmission lines. In another embodiment, the touch electrodes and the signal transmission lines may be formed in a same layer, and then the insulation medium layer is formed, and finally the ground wire is formed. In short, no matter what kind of process is adopted, the above capacitor structures for storing static electricity may be formed as long as the ground wire is arranged at a different layer from and insulated from the signal transmission lines.

By the structure of the touch panel provided by the embodiment of the present disclosure, when a high voltage and a large current are generated in the touch panel, the multilayer structures can bear the high voltage and the large current, and discharge the static electricity generated by the touch electrodes to the ground in time, so as to protect an inner pixel, improve ESD protective performance of the touch panel product, and improve the process yield of the touch panel product.

The above are merely the preferred embodiments of the present disclosure and shall not be used to limit the scope of the present disclosure. It should be noted that, a person skilled in the art may make improvements and modifications without departing from the principle of the present disclosure, and these improvements and modifications shall also fall within the scope of the present disclosure.

What is claimed is:

1. A method for manufacturing a touch panel, comprising:
   forming signal transmission lines that are connected with touch electrodes on the touch panel, and forming a ground wire that is arranged at a different layer from and insulated from the signal transmission lines, a projection of the ground wire onto a plane in which the signal transmission lines are located intersecting the signal transmission lines; and
   forming an insulation medium layer between the signal transmission lines and the ground wire,
   wherein a plurality of capacitor structures for storing static electricity is formed by the signal transmission lines and the ground wire at intersections;
   the step of forming signal transmission lines that are connected with touch electrodes on the touch panel, and a ground wire that is arranged at a different layer from and insulated from the signal transmission lines comprises:
   a line width of each signal transmission line is greater than or equal to 2.5 mm, and less than or equal to 4.5 mm;
   the signal transmission lines are made of a metal material or a transparent conducting material;
   the transparent conducting material comprises indium tin oxide or aluminum-doped zinc oxide, and the metal material comprises molybdenum, aluminum or copper; and
   the insulation medium layer is a polypropylene film, a polyethylene film or air.

2. The method according to claim 1, wherein the touch electrodes are made of aluminum-doped zinc oxide or graphene.

3. A touch panel, comprising:
   touch electrodes;
   signal transmission lines, connected with the touch electrodes; and a ground wire, arranged at a different layer from and insulated from the signal transmission lines, a projection of the ground wire onto a plane in which the signal transmission lines are located intersecting the signal transmission lines;
wherein a plurality of capacitor structures for storing static electricity is formed by the signal transmission lines and the ground wire at intersections;
an insulation medium layer between the signal transmission lines and the ground wire;
a line width of each signal transmission line is greater than or equal to 2.5 mm, and less than or equal to 4.5 mm;
the signal transmission lines are made of a metal material or a transparent conducting material;
the transparent conducting material comprises indium tin oxide or aluminum-doped zinc oxide, and the metal material comprises molybdenum, aluminum or copper; and
the insulation medium layer is a polypropylene film, a polyethylene film or air.

4. The touch panel according to claim 3, wherein the touch electrodes are made of aluminum-doped zinc oxide or graphene.

5. A display device, comprising the touch panel according to claim 3.

6. The display device according to claim 5, the touch electrodes are made of aluminum-doped zinc oxide or graphene.

* * * * *